United States Patent
Zhou et al.

(10) Patent No.: US 11,438,777 B2
(45) Date of Patent: Sep. 6, 2022

(54) METHOD AND APPARATUS FOR MONITORING ZIGBEE NODE NETWORK STATUS

(71) Applicant: SENGLED CO., LTD., Shanghai (CN)

(72) Inventors: Yuhang Zhou, Shanghai (CN); Xia Wang, Shanghai (CN); Jinxiang Shen, Shanghai (CN)

(73) Assignee: SENGLED CO., LTD., Shanghai (CN)

( * ) Notice: Subject to any disclaimer, the term of this patent is extended or adjusted under 35 U.S.C. 154(b) by 263 days.

(21) Appl. No.: 16/957,337

(22) PCT Filed: Dec. 26, 2018

(86) PCT No.: PCT/CN2018/123984
§ 371 (c)(1),
(2) Date: Jun. 23, 2020

(87) PCT Pub. No.: WO2019/129089
PCT Pub. Date: Jul. 4, 2019

(65) Prior Publication Data
US 2020/0336929 A1  Oct. 22, 2020

(30) Foreign Application Priority Data
Dec. 26, 2017 (CN) .......................... 201711429110.X

(51) Int. Cl.
*H04W 24/08* (2009.01)
*H04W 76/18* (2018.01)
(Continued)

(52) U.S. Cl.
CPC ............. *H04W 24/08* (2013.01); *H04W 4/80* (2018.02); *H04W 76/18* (2018.02); *H04W 88/16* (2013.01)

(58) Field of Classification Search
CPC ....... H04W 24/08; H04W 4/80; H04W 76/18; H04W 88/16; H04W 76/19; H04W 84/18; H04W 48/16
See application file for complete search history.

(56) References Cited

U.S. PATENT DOCUMENTS 7,961,661 B2 *  6/2011  Hargrave .............. H04W 28/06
                                                              370/395.2
9,717,132 B2 *  7/2017  Sun ........................ H05B 47/12
(Continued)

FOREIGN PATENT DOCUMENTS

CA        2964915 A1 *  5/2018
CN        204157061 U    2/2015
(Continued)

OTHER PUBLICATIONS

The World Intellectual Property Organization (WIPO) International Search Report and Written Opinion for PCT/CN2018/123984 dated Mar. 27, 2019 8 Pages.

*Primary Examiner* — Mounir Moutaouakil
(74) *Attorney, Agent, or Firm* — Anova Law Group, PLLC

(57) ABSTRACT

The present disclosure provides a method for monitoring a network status of a Zigbee node. The method includes: acquiring a value of a status tag configured on the Zigbee node, the value of the status tag indicating a current network status of the Zigbee node; and determining that the value of the status tag equals a first preset value and a preset condition associated with the status tag is met. The first preset value indicates that the Zigbee node has joined a Zigbee coordinator but has not joined a gateway. The method also includes: in response to determining that the value of the status tag equals the first preset value and the preset condition is met, restarting the Zigbee node and
(Continued)

Acquiring the value of the status tag — S101

When it is determined that the value of the status tag equals the first preset value, and the pre-configured condition is met, performing a restart operation to reset the status tag of the Zigbee node to an initial value — S102 resetting the value of the status tag to an initial value. The initial value indicates that the Zigbee node has not joined the Zigbee coordinator.

10 Claims, 10 Drawing Sheets

(51) Int. Cl.
*H04W 4/80* (2018.01)
*H04W 88/16* (2009.01)

(56) References Cited

U.S. PATENT DOCUMENTS

| | | | | |
|---|---|---|---|---|
| 10,320,763 | B2* | 6/2019 | Erickson | H04L 9/3265 |
| 2009/0092049 | A1* | 4/2009 | Hargrave | H04W 28/06 |
| | | | | 370/235 |
| 2009/0092146 | A1* | 4/2009 | Hargrave | H04W 76/10 |
| | | | | 370/428 |
| 2009/0094349 | A1* | 4/2009 | Smith | H04L 1/12 |
| | | | | 709/220 |
| 2010/0150065 | A1* | 6/2010 | Kim | H04W 16/14 |
| | | | | 370/328 |
| 2015/0051717 | A1* | 2/2015 | Krutsch | H02J 3/14 |
| | | | | 700/90 |
| 2017/0127468 | A1* | 5/2017 | Saikusa | H04W 76/19 |
| 2017/0265066 | A1 | 9/2017 | Vyas et al. | |

FOREIGN PATENT DOCUMENTS

| | | |
|---|---|---|
| CN | 104469895 A | 3/2015 |
| CN | 105722088 A | 6/2016 |
| CN | 108184260 A | 6/2018 |
| WO | 2008112248 A1 | 9/2008 |

* cited by examiner

METHOD AND APPARATUS FOR MONITORING ZIGBEE NODE NETWORK STATUS

CROSS-REFERENCES TO RELATED APPLICATIONS

This application is a national phase entry under 35 U.S.C. § 371 of International Application No. PCT/CN2018/123984, filed on Dec. 26, 2018, which claims priority to Chinese Patent Application No. 201711429110.X, filed on Dec. 26, 2017, the entire contents of both of which are incorporated herein by reference.

TECHNICAL FIELD

The present disclosure relates to the field of Zigbee network technologies, and in particular, to a method and apparatus for monitoring Zigbee node network status.

BACKGROUND

Networks based on Zigbee technology are characterized by low power consumption, low cost, low speed, and capability of supporting a large number of nodes. These features are suitable for various network topologies; thus Zigbee technology is widely used in the fields such as automatic control and remote control.

In typical gateway systems, after a Zigbee node joins a network of a coordinator, it is possible that the Zigbee node is unable to keep in sync with the state of the gateway, so that the Zigbee node may join the coordinator but not the gateway. When this happens, the network control terminal cannot successfully interface or display the device associated with the Zigbee node, and the Zigbee device cannot be controlled by the control terminal. In response to this situation, an existing method is to manually reset the Zigbee node to make it go off-grid and then re-join the gateway.

However, relying on manual reset to re-join the Zigbee node to the gateway requires high operation and maintenance costs as well as low maintenance efficiency.

SUMMARY

The present disclosure provides a Zigbee node network status monitoring method and apparatus. The method and apparatus may be used to detect the network status of a Zigbee node in a Zigbee network, and automatically reset a Zigbee node when the Zigbee node is found to have joined a Zigbee coordinator but not the gateway, so that the Zigbee node may be able to successfully join the gate after reset.

One aspect of the present disclosure provides a method for monitoring a network status of a Zigbee node. The method includes: acquiring a value of a status tag configured on the Zigbee node, the value of the status tag indicating a current network status of the Zigbee node; and determining that the value of the status tag equals a first preset value and a preset condition associated with the status tag is met. The first preset value indicates that the Zigbee node has joined a Zigbee coordinator but has not joined a gateway. The method also includes: in response to determining that the value of the status tag equals the first preset value and the preset condition is met, restarting the Zigbee node and resetting the value of the status tag to an initial value. The initial value indicates that the Zigbee node has not joined the Zigbee coordinator.

Optionally, the method also includes: in response to determining that the value of the status tag is the initial value, sending a join request to the Zigbee coordinator; receiving a first tag from the Zigbee coordinator, a value of the first tag being set to the first preset value; and updating the value of the status tag using the value of the first tag.

Optionally, the preset condition includes: a time period during which the status tag maintains at the first preset value is greater than a predefined time limit.

Optionally, the method also includes: after receiving the first tag from the Zigbee coordinator, receiving a second tag from the Zigbee coordinator, a value of the second tag being a second preset value indicating that the Zigbee node has joined the gateway; and updating the value of the status tag using the value of the second tag.

Another aspect of the present disclosure provides a method for monitoring a network status of a Zigbee node. The method includes: when a value of a status tag of the Zigbee node is an initial value, receiving, by a Zigbee coordinator, a join request from the Zigbee node; and sending, by the Zigbee coordinator, a first tag to the Zigbee node so that the Zigbee node uses a value of the first tag to update the value of the status tag when the Zigbee coordinator accepts the join request of the Zigbee node, the value of the first tag being set to a first preset value. The first preset value indicates that the Zigbee node has joined the Zigbee coordinator but has not joined a gateway.

Optionally, the method also includes: after sending the first tag to the Zigbee node, requesting, by the Zigbee coordinator, the gateway to add the Zigbee node; when the Zigbee node joins the gateway, receiving, by the Zigbee coordinator, a feedback message from the gateway; and in response to the feedback message, sending, by the Zigbee coordinator, a second tag to the Zigbee node so that the Zigbee node uses a value of the second tag to update the value of the status tag, the value of the second tag being set to a second preset value. The second preset value indicates that the Zigbee node has joined the gateway.

Another aspect of the present disclosure provides a Zigbee node including a memory and a processor coupled to the memory. The processor is configured to perform: acquiring a value of a status tag configured on the Zigbee node, the value of the status tag indicating a current network status of the Zigbee node; and determining that the value of the status tag equals a first preset value and a preset condition associated with the status tag is met. The first preset value indicates that the Zigbee node has joined a Zigbee coordinator but has not joined a gateway. The processor is also configured to perform: in response to determining that the value of the status tag equals the first preset value and the preset condition is met, restarting the Zigbee node and resetting the value of the status tag to an initial value. The initial value indicates that the Zigbee node has not joined the Zigbee coordinator.

Optionally, the processor is also configured to perform: in response to determining that the value of the status tag is the initial value, sending a join request to the Zigbee coordinator; receiving a first tag from the Zigbee coordinator, a value of the first tag being set to the first preset value; and updating the value of the status tag using the value of the first tag.

Optionally, the preset condition includes: a time period during which the status tag maintains at the first preset value is greater than a predefined time limit.

Optionally, the processor is also configured to perform: after receiving the first tag from the Zigbee coordinator, receiving a second tag from the Zigbee coordinator, a value of the second tag being a second preset value indicating that the Zigbee node has joined the gateway; and updating the value of the status tag using the value of the second tag.

Another aspect of the present disclosure provides a Zigbee node including a memory and a processor coupled to the memory. The processor is configured to perform: when a value of a status tag of the Zigbee node is an initial value, receiving a join request from the Zigbee node; and sending a first tag to the Zigbee node so that the Zigbee node uses a value of the first tag to update the value of the status tag when the Zigbee coordinator accepts the join request of the Zigbee node, the value of the first tag being set to a first preset value. The first preset value indicates that the Zigbee node has joined the Zigbee coordinator but has not joined a gateway.

Optionally, the processor is also configured to perform: after sending the first tag to the Zigbee node, requesting the gateway to add the Zigbee node; when the Zigbee node joins the gateway, receiving a feedback message from the gateway; and in response to the feedback message, sending a second tag to the Zigbee node so that the Zigbee node uses a value of the second tag to update the value of the status tag, the value of the second tag being set to a second preset value. The second preset value indicates that the Zigbee node has joined the gateway.

Another aspect of the present disclosure provides a system for monitoring a network status of a Zigbee node. The system may include the Zigbee node as described above.

Optionally, the system may further include the Zigbee coordinator as described above.

In the methods and apparatus for monitoring Zigbee network status provided by the present disclosure, a value of a status tag is acquired. The status tag is configured to identify a current network status of the Zigbee node. If the status tag is determined to be a first preset value and certain preset conditions are satisfied, a restart operation is performed to reset the status tag of the Zigbee node to an initial value. The first preset value is used to identify that the Zigbee node has joined the Zigbee coordinator but not the gateway. The initial value is used to identify that the Zigbee node has not been added to the Zigbee coordinator, and is still in a network search state. Therefore, the network status of the Zigbee node in the Zigbee network may be detected. When the Zigbee node has joined the Zigbee coordinator but not the gateway, the automatic restart operation is implemented to reset the Zigbee node to ensure that the Zigbee node may successfully join the gateway.

BRIEF DESCRIPTION OF THE DRAWINGS

In order to more clearly illustrate the technical solutions in the embodiments of the present disclosure, the drawings used in the description of the embodiments will be briefly described below. The drawings in the following description illustrate certain embodiments of the present disclosure, and other drawings may be acquired by those skilled in the art without inventive effort.

DETAILED DESCRIPTION OF THE EMBODIMENTS

Figure 1:
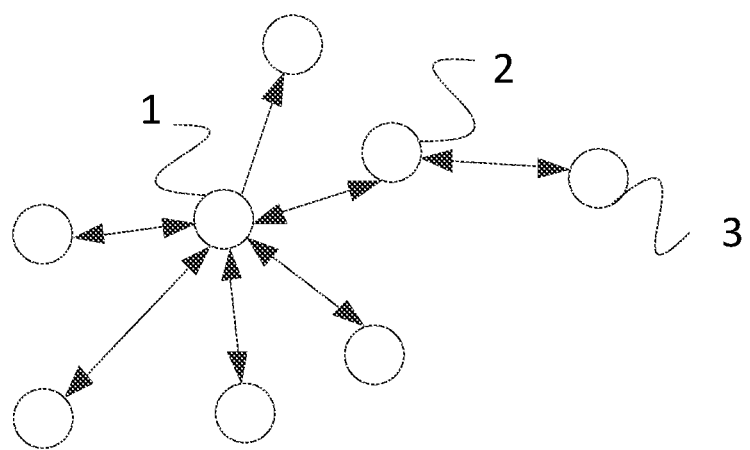
FIG. 1 is a schematic diagram of a Zigbee network topology according to an embodiment of the present disclosure.

Technical solutions of the present disclosure will be described with reference to the accompanying drawings. Unless otherwise indicated, the same numerical referrals in different drawings refer to the same or similar elements. Implementations of the following exemplary embodiments described herein are not limiting. Instead, they are merely examples of devices and methods consistent with aspects of the present disclosure. Other embodiments derived by those with ordinary skills in the art according to the described embodiments without inventive efforts shall fall within the scope of the present disclosure.

Unless otherwise stated, the terms "first", "second", "third", "fourth", etc. (if present) in the specification and claims of the present disclosure are used to distinguish similar objects without indicating a specific order or rank. It is to be understood that the data or objects described in such matter may be interchanged where appropriate in the implementation of the embodiments of the present disclosure, for example, in a sequence other than those illustrated or described herein. In addition, the terms "comprises", "comprising", and their derived terms are intended to cover a non-exclusive inclusion. For example, a process, method, system, product, or device that comprises a series of steps or units is not necessarily limited to those steps or units. It may include other steps or units not explicitly listed or inherent to such processes, methods, products or devices.

The technical solutions of the present disclosure will be described in detail below with specific embodiments. Certain described embodiments may be combined with each other, and the same or similar concepts or processes may not be described repeatedly in certain embodiments.

Some of the terms used in the present disclosure are explained below.

1) Zigbee: Zigbee is a low-power local-area-network (LAN) protocol based on the IEEE802.15.4 standard. According to international standards, Zigbee technology is a short-range, low-power wireless communication technology. The term Zigbee technology (also known as the Zigbee Protocol) originated from a honey bee's figure-eight dance. Honey bees rely on flying in a zigzag pattern to communicate the position of food source with other members in the colony. That is to say, the bees rely on such way to form a communication network in the group. Zigbee technology is characterized by close proximity, low complexity, self-organization, low power consumption, and low data rate. It is used in fields such as automatic control and remote control, and may be embedded in various devices. In short, Zigbee is a low-cost, low-power, short-range wireless networking communication technology. Zigbee defines three types of devices: Zigbee coordinators, Zigbee routers, and Zigbee end devices. Each device has its own functional requirements. The Zigbee coordinator is a device that starts and configures the network, and is the central node of the network. A Zigbee network allows only one Zigbee coordinator to maintain the network. The Zigbee router is a device that supports the network connection. It may forward messages to other devices. Zigbee networks with mesh or tree topologies may have multiple Zigbee routers. Zigbee networks with star topology do not support Zigbee routers. The Zigbee end device is a device that perform specific functions. In the present disclosure, the Zigbee routers and the Zigbee end devices are defined as Zigbee nodes, and the Zigbee nodes join the network gateway through the Zigbee coordinator.

2) Gateway: a gateway, also known as an inter-network connector or the protocol converter, implements network interconnection at the transport layer. It is the most complex network interconnection device and is only used for interconnections between networks with different high-level protocols. A clutch-style gateway refers to a type of gateway configured to accept the joining and leaving of eligible nodes, such as through wireless Wi-Fi, when the gateway is open.

3) Wi-Fi: Wi-fi is a technology that allows electronic devices to connect to a wireless local area network (WLAN), typically using a 2.4G UHF or 5G SHF ISM radio frequency band. Connecting to a wireless LAN is usually password protected; but it may also be open, allowing any device within the WLAN range to be connected.

FIG. 1 is a schematic diagram of a Zigbee network topology according to certain embodiments of the present disclosure. As shown in FIG. 1, the Zigbee network topology includes: a plurality of Zigbee nodes and a Zigbee coordinator 1. Some of the Zigbee nodes are provided with router functions, such as the Zigbee router 2. Some other Zigbee nodes are end devices, such as the Zigbee end device 3. A Zigbee node in the Zigbee network topology joins the gateway through the Zigbee coordinator 1. After the Zigbee node joins the network maintained by the Zigbee coordinator, it is possible that the node is not able to synchronize with the state of the clutch-style gateway. Therefore, the Zigbee node may join the Zigbee coordinator but not the gateway. When this happens, the control terminal cannot successfully interface or display the Zigbee end device corresponding to the Zigbee node, so that the Zigbee end device is out of the control of the control terminal. In response to this situation, the existing method may include manually resetting the Zigbee node to make it re-join the gateway after it is off-grid. However, relying on manual reset to re-join the Zigbee node to the gateway requires high operation and maintenance costs and low maintenance efficiency. The network status monitoring method for the Zigbee node provided by the present disclosure aims to solve the above technical problems of the prior art.

The technical solutions of the present disclosure and how the technical solutions of the present disclosure solve the above technical problems will be described in detail below with reference to specific embodiments. The following specific embodiments may be combined with each other, and the same or similar concepts or processes may not be described in some embodiments. Embodiments of the present disclosure will be described below with reference to the accompanying drawings.

Figure 2:
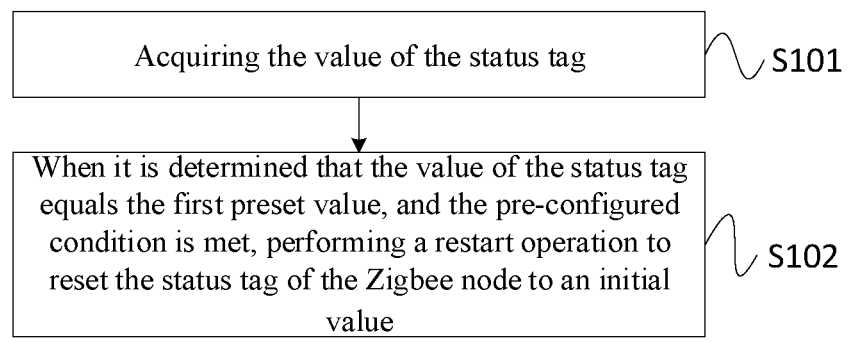
FIG. 2 is a flowchart of a Zigbee node network status monitoring method according to an embodiment of the present disclosure.

FIG. 2 is a flowchart of a method for monitoring a network status of a Zigbee node according to certain embodiments of the present disclosure. The method may be implemented by a Zigbee node. As shown in FIG. 2, the method may include:

S101. Acquiring the value of the status tag.

In certain embodiments, each Zigbee node in the Zigbee network is provided with a status tag, and the value of the status tag may be changed according to a received tag, so the status tag may be assigned different values to indicate the current network status of the Zigbee node. The value of the status tag may be detected after the Zigbee node is powered on; or the value of the Zigbee node status tag may be randomly sampled during the network-forming process of the Zigbee network.

Optionally, a self-test function may also be configured on a Zigbee node (Zigbee end device), and the value of the status tag is automatically detected (e.g., by the Zigbee node) to acquire the current network status of the Zigbee node in real time.

S102. When it is determined that the value of the status tag equals the first preset value, and the pre-configured condition is met, performing a restart operation to reset the status tag of the Zigbee node to an initial value.

In certain embodiments, the first preset value is used to indicate that the Zigbee node has joined the Zigbee coordinator but not the gateway. The initial value is used to indicate that the Zigbee node has not been added to the Zigbee coordinator, and is still in the network search state. When it is detected that the value of the status tag of the Zigbee node equals the first preset value and the pre-configured condition is met, a restart operation is performed. To restart, the Zigbee node may be switched off from the power-on state, and after the Zigbee node is powered on again, the Zigbee node's status tag is reset to the initial value, and the Zigbee node is in a network search state. When a Zigbee coordinator is found, the Zigbee node may request to join the Zigbee coordinator and then join a gateway associated with the Zigbee coordinator.

Optionally, the pre-configured condition may include: the time period during which the status tag is maintained at the first preset value is greater than a pre-defined time limit.

As an example, the value of the status tag of the Zigbee node may be set to 0 to indicate the Zigbee node has been reset, and is still in the network search state. At this time, the Zigbee node has not been added to the Zigbee coordinator or the gateway. The value of the status tag of the Zigbee node may be set to 1 to indicate that the Zigbee node has joined the Zigbee coordinator but not the gateway. The value of the status tag of the Zigbee node may be set to 2 to indicate that the Zigbee node has joined the gateway. Setting the value of the status tag may be implemented by the Zigbee node itself based on its current network connection situation.

In certain embodiments, by acquiring the value of the status tag, the status tag may indicate the current network status of the Zigbee node. When the status tag is determined to be the first preset value and the pre-configured condition is met, a restart operation is performed, so that the status tag of the Zigbee node is reset to an initial value. The first preset value is used to indicate that the Zigbee node has joined the Zigbee coordinator but not the gateway. The initial value is used to identify that the Zigbee node has not been added to the Zigbee coordinator, and is in the network search state.

Thus, the network status of the Zigbee node in the Zigbee network is identified. When the Zigbee node joins the Zigbee coordinator but not the gateway, the automatic restart operation of the Zigbee node is implemented so that the Zigbee node may successfully join the gateway.

Figure 3:
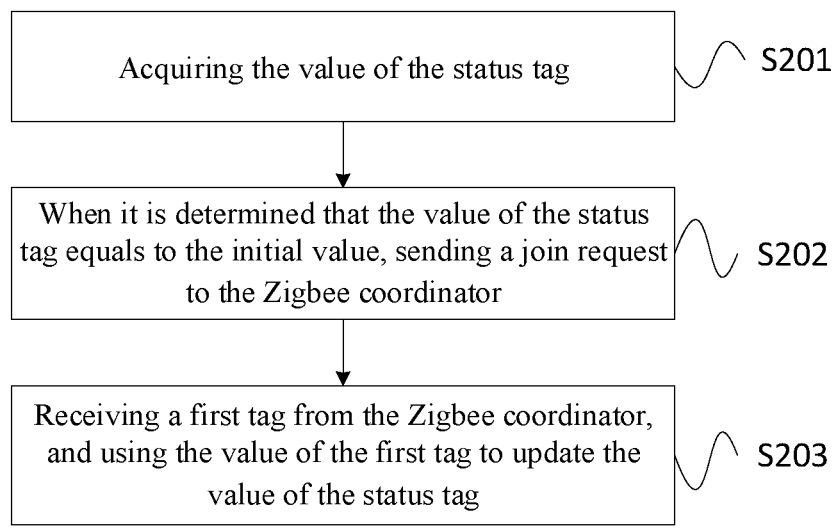
FIG. 3 is a flowchart of a Zigbee node network status monitoring method according to another embodiment of the present disclosure.

FIG. 3 is a flowchart of a method for monitoring a network status of a Zigbee node according to certain other embodiments of the present disclosure. The method may be implemented by a Zigbee node. As shown in FIG. 3, the method may include:

S201. Acquiring the value of the status tag.

In certain embodiments, the implementation process of step S201 is similar to the description in the method shown in FIG. 2, and the details are not described herein again.

S202. When it is determined that the value of the status tag equals the initial value, sending a join request to the Zigbee coordinator.

In certain embodiments, when the value of the Zigbee node's status tag equals the initial value, the Zigbee node sends a join request to the Zigbee coordinator in the Zigbee network.

S203. Receiving a first tag from the Zigbee coordinator, and using the value of the first tag to update the value of the status tag.

In certain embodiments, when the Zigbee node successfully joins the Zigbee coordinator in the Zigbee network, the Zigbee coordinator may send the first tag to the Zigbee node. The value of the first tag may be the first preset value, and the first preset value is used to indicate that the Zigbee node has joined the Zigbee coordinator but not the gateway.

In certain embodiments, when the Zigbee node is successfully added to the Zigbee coordinator, the Zigbee node receives the first tag sent back from the Zigbee coordinator, and the value of the Zigbee node status tag is updated to the value of the first tag, thereby signifying that the Zigbee node has joined the Zigbee coordinator but not the gateway. The Zigbee node's network status is thus identified.

Figure 4:
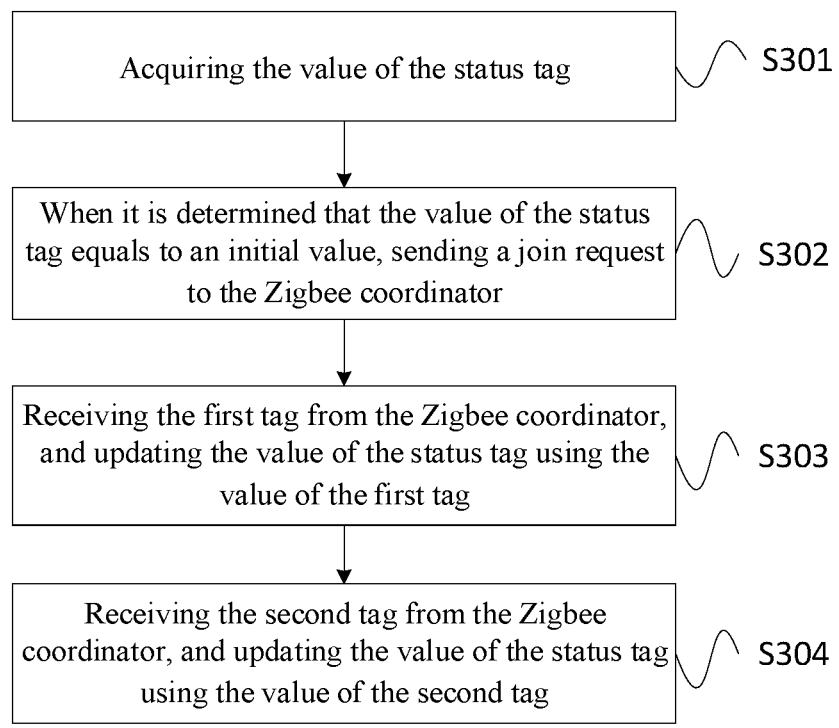
FIG. 4 is a flowchart of a Zigbee node network status monitoring method according to another embodiment of the present disclosure.

FIG. 4 is a flowchart of a method for monitoring a network status of a Zigbee node according to certain other embodiments of the present disclosure. The method may be implemented by a Zigbee node. As shown in FIG. 4, the method may include:

S301. Acquiring the value of the status tag.

S302. When it is determined that the value of the status tag equals an initial value, sending a join request to the Zigbee coordinator.

S303. Receiving the first tag from the Zigbee coordinator, and updating the value of the status tag using the value of the first tag.

In certain embodiments, the implementation process of steps S301-303 is similar to those as described in the method shown in FIG. 3, and the details are not described herein again.

S304. Receiving the second tag from the Zigbee coordinator, and updating the value of the status tag using the value of the second tag.

In certain embodiments, the value of the second tag is the second preset value which indicates that the Zigbee node has joined the gateway.

In certain embodiments, when the Zigbee node successfully joins the gateway, the Zigbee node receives the second tag sent by the Zigbee coordinator, and the value of the Zigbee node status tag is updated to the value of the second tag to indicate that the Zigbee node has successfully joined the gateway. Thus, the Zigbee nodes that have joined the Zigbee coordinator but not the gateway may be timely discovered, so that they may be restarted and successfully join the gateway.

Figure 5:
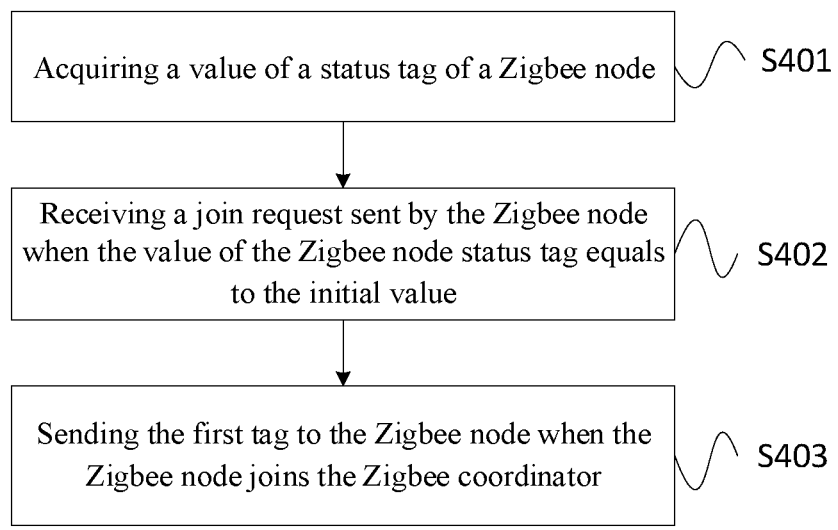
FIG. 5 is a flowchart of a Zigbee node network status monitoring method according to another embodiment of the present disclosure.

FIG. 5 is a flowchart of a method for monitoring the network status of a Zigbee node according to certain other embodiments of the present disclosure. The method may be implemented by a Zigbee coordinator. As shown in FIG. 5, the method may include:

S401. Acquiring a value of a status tag of a Zigbee node.

In certain embodiments, each Zigbee node in the Zigbee network is configured with a status tag, and the value of the status tag may be changed according to a received tag, so the status tag may be assigned with different values to indicate the current network status of the Zigbee node.

S402. Receiving a join request sent by the Zigbee node when the value of the Zigbee node status tag equals the initial value.

In certain embodiments, the initial value is used to indicate that the Zigbee node has not been added to the Zigbee coordinator, and is still in a network search state. When the status tag of the Zigbee node is reset to an initial value, and the Zigbee node is in a network search state, and when the gateway is found, the Zigbee coordinator receives the join request sent by the Zigbee node.

S403. Sending the first tag to the Zigbee node when the Zigbee node joins the Zigbee coordinator.

In certain embodiments, when the Zigbee coordinator accepts the join request and the Zigbee node is successfully added to the Zigbee coordinator, the Zigbee coordinator sends a first tag to the Zigbee node. The value of the first tag may be the first preset value used to indicate that the Zigbee node has joined the Zigbee coordinator but not the gateway.

In certain embodiments, the value of the Zigbee node status tag is acquired. When the value of the Zigbee node status tag equals the initial value, the join request sent by the Zigbee node is received. When the Zigbee node joins the Zigbee coordinator, the Zigbee coordinator send the first tag to the Zigbee node. The value of the first tag may be the first preset value to indicate that the Zigbee node has joined the Zigbee coordinator but not the gateway. Thereby, the state that the Zigbee node has joined the Zigbee coordinator but not the gateway is identified.

Figure 6:
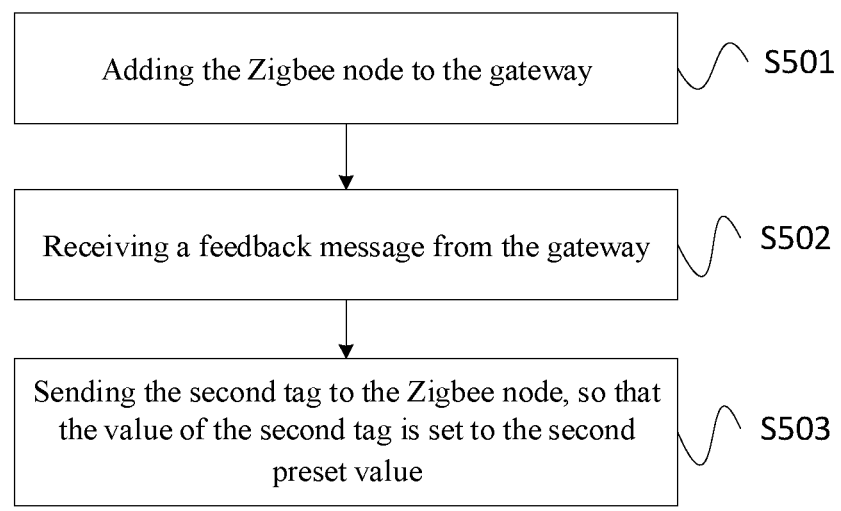
FIG. 6 is a flowchart of a Zigbee node network status monitoring method according to another embodiment of the present disclosure.

FIG. 6 is a flowchart of a method for monitoring the network status of a Zigbee node according to certain other embodiments of the present disclosure. The method may be implemented by a Zigbee coordinator. As shown in FIG. 6, the method in certain embodiments is based on the method shown in FIG. 4. and after sending the first tag to the Zigbee node, the method may further include:

S501. Adding the Zigbee node to the gateway.

In certain embodiments, the Zigbee coordinator communicates the newly added Zigbee node to the gateway, requesting adding the newly added Zigbee node to the gateway.

S502. Receiving a feedback message from the gateway.

In certain embodiments, after the Zigbee node successfully joins the gateway, the gateway may send a feedback message to the Zigbee coordinator to indicate that the Zigbee node has joined the gateway.

S503. Sending the second tag to the Zigbee node, the value of the second tag is set to the second preset value.

In certain embodiments, after receiving the feedback message from the gateway, the Zigbee coordinator may send a second tag to the Zigbee node. The value of the second tag may be set to the second preset value to indicate that the Zigbee node has joined the gateway.

In certain embodiments, when the Zigbee node successfully joins the gateway, the second tag sent by the Zigbee coordinator is received, and the value of the Zigbee node status tag is updated to the value of the second tag to indicate that the Zigbee node has been successfully added to the gateway. Thus, the network may timely discover the Zigbee nodes that have joined the Zigbee coordinator but not the gateway, ensuring that the Zigbee nodes may successfully join the gateway.

Figure 7:
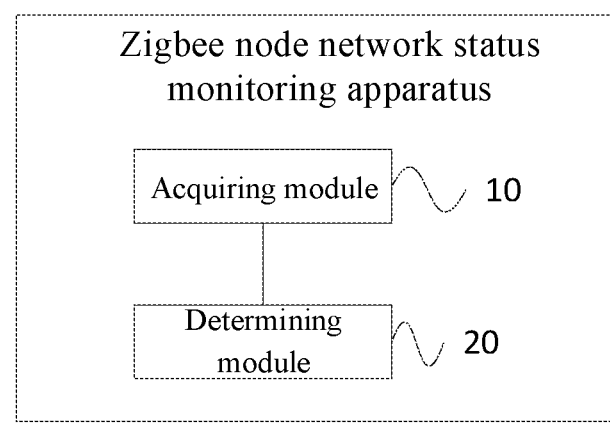
FIG. 7 is a schematic structural diagram of a Zigbee node network status monitoring apparatus according to an embodiment of the present disclosure.

FIG. 7 is a schematic structural diagram of an apparatus for monitoring the network status monitoring of a Zigbee node according to certain embodiments of the present disclosure. The apparatus may be applied in a Zigbee node. As shown in FIG. 7, the apparatus may include the following modules.

The acquiring module 10 is configured to acquire a value of the status tag, where the status tag is used to identify a current network status of the Zigbee node.

The determining module 20 is configured to: when the status tag is determined to be the first preset value and meet certain pre-configured condition, perform a restart operation to reset the status tag of the Zigbee node to the initial value. The first preset value is used to indicate that the Zigbee node has joined the Zigbee coordinator but not the gateway. The initial value is used to indicate that the Zigbee node has not joined the Zigbee coordinator, and is in a network search state.

Optionally, the determining module 20 is further configured to: after acquiring the value of the status tag, determine that the status tag is an initial value, and send a join request to the Zigbee coordinator; and receive the first tag sent from the Zigbee coordinator, and update the status tag to the value of the first tag, where the value of the first tag may be the first preset value.

Optionally, the pre-configured condition includes: the time period during which the status tag is maintained at the first preset value is greater than a pre-defined time limit.

Certain embodiments may perform the technical solutions in the foregoing method shown in FIGS. 2-4, and the implementation process and effects are similar to the those described methods. The details are not described herein again.

Figure 8:
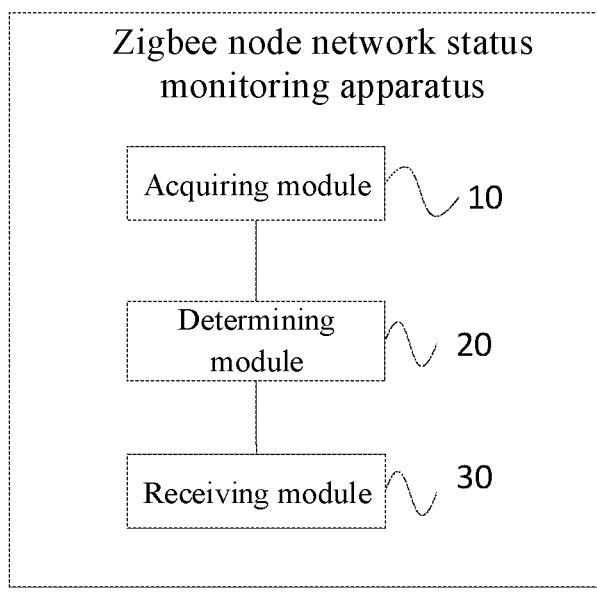
FIG. 8 is a schematic structural diagram of a Zigbee node network status monitoring apparatus according to another embodiment of the present disclosure.

FIG. 8 is a schematic structural diagram of an apparatus for monitoring the network status of a Zigbee node according to certain embodiments of the present disclosure. The apparatus may be applied in a Zigbee node. As shown in FIG. 8, the apparatus may further include the following modules.

The receiving module 30 is configured to: after receiving the first tag from the Zigbee coordinator, receive the second tag from the Zigbee coordinator, and update the status tag to the value of the second tag. The value of the second tag may be the second preset value which indicates that the Zigbee node has joined the gateway.

Certain embodiments may perform the technical solutions in the foregoing method shown in FIGS. 2-4, and the implementation process and technical effects are similar to those of the foregoing methods. The details are not described herein again.

Figure 9:
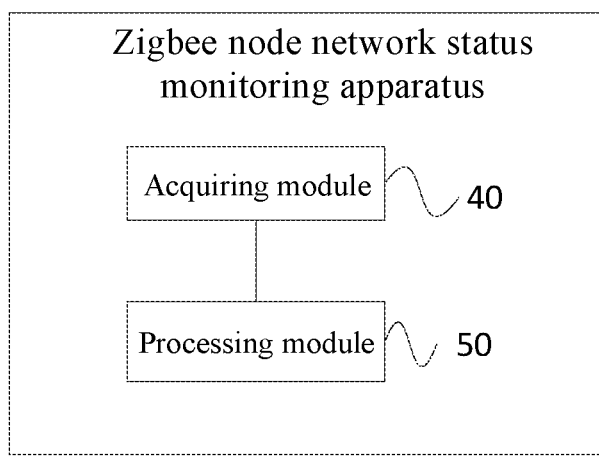
FIG. 9 is a schematic structural diagram of a Zigbee node network status monitoring apparatus according to another embodiment of the present disclosure.

FIG. 9 is a schematic structural diagram of an apparatus for monitoring Zigbee node network status according to certain embodiments of the present disclosure. The apparatus may be applied in a Zigbee coordinator. As shown in FIG. 9, the apparatus may include the following modules.

The acquiring module 40 is configured to acquire the value of the status tag of the Zigbee node. In some embodiments, the acquiring module 40 may be omitted. The processing module 50 is configured to receive the join request sent by the Zigbee node when the value of the Zigbee node status tag equals the initial value, and send a first tag to the Zigbee node when the Zigbee node joins the Zigbee coordinator. The value of the first tag may be the first preset value which indicates that the Zigbee node has joined the Zigbee coordinator but not the gateway.

Optionally, the processing module 50 is further configured to: after sending the first tag to the Zigbee node, add the Zigbee node to the gateway; receive a feedback message from the gateway, where the feedback message is used to indicate that the Zigbee node has joined the gateway; send a second tag to the Zigbee node, where the value of the second tag may be the second preset value which indicates that the Zigbee node has joined the gateway.

Certain embodiments may perform the technical solutions in the foregoing methods shown in FIG. 5 and FIG. 6. The implementation process and technical effects are similar to those of the foregoing methods. The details are not described herein again.

Figure 10:
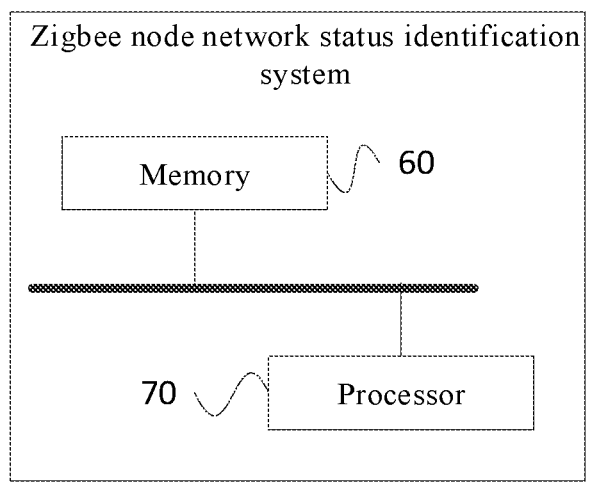
FIG. 10 is a schematic structural diagram of a network status monitoring system for a Zigbee node according to an embodiment of the present disclosure.

FIG. 10 is a schematic structural diagram of a network status monitoring system for a Zigbee node according to certain embodiments of the present disclosure. As shown in FIG. 10, the system may include a memory 60, a processor 70, and the memory 60 is communicatively coupled to the processor 70. The memory 60 is used for storing programed instructions. The processor 70 is configured to execute the programed instructions stored in the memory to perform the steps of any of the methods as described in FIGS. 2-4, and/or the steps of any of the methods as described in FIG. 5 and FIG. 6.

Certain embodiments may perform the technical solutions in the foregoing methods shown in FIGS. 2-6. The implementation process and technical effects are similar to those of the foregoing methods. The details are not described herein again.

In addition, according to certain embodiments, the present disclosure further provides a computer readable storage medium that stores the computer execution instructions. When at least one processor of a user device executes the instructions stored in the computer readable storage medium, the user device performs the various methods in the foregoing description.

The computer readable medium may comprise a computer storage medium and a communication medium. The communication medium comprises any medium that facilitates transfer of the computer program from one location to another. A storage medium may be any of the available media that can be accessed by a general purpose or special purpose computer. An exemplary storage medium is coupled to the processor to enable the processor to read information from, and write information to, the storage medium. The storage medium can also be an integral part of the processor. The processor and the storage medium can be located in an application-specific integrated circuit (ASIC). Further, the ASIC may be located in the user device. The processor and the storage medium may also reside as discrete components in a communication device.

It will be understood by those skilled in the art that all or part of the steps of implementing the above method embodiments may be performed by hardware related to the programed instructions. The foregoing programed instructions may be stored in a computer readable storage medium. The program, when executed, performs the steps including the foregoing methods; and the foregoing storage medium includes various medium types that can store program codes, such as a (read-only memory) ROM, a (random-access memory) RAM, a magnetic disk, an optical disk, and so on.

When the foregoing described embodiments are implemented in a form of a software functional module or submodules and used as an independent product, the software module or submodule may be computer programs stored in the foregoing computer readable storage medium. Based on such an understanding, the technical solutions of this application, or all or some of the technical solutions may be implemented in a form of a software product by one or more processors executing the software modules or submodules. The computer software product modules or units may be stored in a storage medium and includes several instructions for instructing one or more computer devices (which may be a personal computer, a server, a network device, or the like) to perform all or some of the steps of the methods described in the embodiments of this application.

In addition, functional modules or submodules in the embodiments of this application may be integrated into one processing unit, or each of the units may exist alone physically, or two or more units are integrated into one unit. The functional module or unit may be implemented in a form of hardware, in a form of software functional modules and units, or may be implemented by a combination of software and hardware components.

Other embodiments of the invention will be apparent to those skilled in the art. The present disclosure is intended to cover any variations, uses, or adaptations that are in accordance with the general principles of the present disclosure.

What is claimed is:

1. A method for monitoring a network status of a Zigbee node, comprising:
    acquiring a value of a status tag configured on the Zigbee node, the value of the status tag indicating a current network status of the Zigbee node;
    determining that the value of the status tag equals a first preset value and a preset condition associated with the status tag is met, wherein the first preset value indicates that the Zigbee node has joined a Zigbee coordinator but has not joined a gateway; and
    in response to determining that the value of the status tag equals the first preset value and the preset condition is met, restarting the Zigbee node and resetting the value of the status tag to an initial value, wherein the initial value indicates that the Zigbee node has not joined the Zigbee coordinator.

2. The method according to claim 1, further comprising:
    in response to determining that the value of the status tag is the initial value, sending a join request to the Zigbee coordinator;
    receiving a first tag from the Zigbee coordinator, wherein a value of the first tag is set to the first preset value; and
    updating the value of the status tag using the value of the first tag.

3. The method according to claim 2, further comprising:
    after receiving the first tag from the Zigbee coordinator, receiving a second tag from the Zigbee coordinator, wherein a value of the second tag is a second preset value indicating that the Zigbee node has joined the gateway; and
    updating the value of the status tag using the value of the second tag.

4. The method according to claim 1, wherein the preset condition includes: a time period during which the status tag maintains at the first preset value is greater than a predefined time limit.

5. A system for monitoring a network status of a Zigbee node, comprising:
    the Zigbee node, wherein:
    the Zigbee node comprises a first memory storing one or more computer programs; and a first processor coupled to the first memory and configured to perform:
    acquiring a value of a status tag configured on the Zigbee node, the value of the status tag indicating a current network status of the Zigbee node;
    determining that the value of the status tag equals a first preset value and a preset condition associated with the status tag is met, wherein the first preset value indicates that the Zigbee node has joined a Zigbee coordinator but has not joined a gateway; and
    in response to determining that the value of the status tag equals the first preset value and the preset condition is met, restarting the Zigbee node and resetting the value of the status tag to an initial value, wherein the initial value indicates that the Zigbee node has not joined the Zigbee coordinator.

6. The system according to claim 5, wherein the first processor is further configured to perform:
    in response to determining that the value of the status tag is the initial value, sending a join request to the Zigbee coordinator;
    receiving a first tag from the Zigbee coordinator, wherein a value of the first tag is set to the first preset value; and
    updating the value of the status tag using the value of the first tag.

7. The system according to claim 6, wherein the first processor is further configured to perform:
    after receiving the first tag from the Zigbee coordinator, receiving a second tag from the Zigbee coordinator, wherein a value of the second tag is a second preset value indicating that the Zigbee node has joined the gateway; and
    updating the value of the status tag using the value of the second tag.

8. The system according to claim 5, wherein the preset condition includes: a time period during which the status tag maintains at the first preset value is greater than a predefined time limit.

9. The system according to claim 5, further comprising:
    the Zigbee coordinator, wherein:
    the Zigbee coordinator comprises a second memory storing one or more computer programs; and a second processor coupled to the second memory and configured to perform:
    when the value of the status tag of the Zigbee node is the initial value, receiving the join request from the Zigbee node; and
    sending a first tag to the Zigbee node so that the Zigbee node uses a value of the first tag to update the value of the status tag when the join request of the Zigbee node is accepted, the value of the first tag being set to the first preset value.

10. The system according to claim 9, wherein the second processor is further configured to perform:
    after sending the first tag to the Zigbee node, requesting the gateway to add the Zigbee node;
    when the Zigbee node joins the gateway, receiving a feedback message from the gateway; and
    in response to the feedback message, sending a second tag to the Zigbee node so that the Zigbee node uses a value of the second tag to update the value of the status tag, the value of the second tag being set to a second preset value, wherein the second preset value indicates that the Zigbee node has joined the gateway.

* * * * *